(12) United States Patent
Sprengers et al.

(10) Patent No.: US 12,523,649 B2
(45) Date of Patent: *Jan. 13, 2026

(54) METHOD AND DEVICE FOR PERFORMING HETEROGENEOUS IMMUNOASSAYS

(71) Applicant: Meon Medical Solutions Gmbh & Co KG, Graz (AT)

(72) Inventors: Wolfgang Sprengers, Vasoldsberg (AT); Arnold Bartel, Graz (AT); Reinhard Marik, Graz (AT)

(73) Assignee: Meon Medical Solutions Gmbh & Co KG, Graz (AT)

( * ) Notice: Subject to any disclaimer, the term of this patent is extended or adjusted under 35 U.S.C. 154(b) by 1092 days.

This patent is subject to a terminal disclaimer.

(21) Appl. No.: 17/260,195

(22) PCT Filed: Jul. 11, 2019

(86) PCT No.: PCT/AT2019/060230
§ 371 (c)(1),
(2) Date: Jan. 13, 2021

(87) PCT Pub. No.: WO2020/010379
PCT Pub. Date: Jan. 16, 2020

(65) Prior Publication Data
US 2021/0270819 A1    Sep. 2, 2021

(30) Foreign Application Priority Data

Jul. 13, 2018  (AT) .............................. A 50603/2018

(51) Int. Cl.
*G01N 35/10*    (2006.01)
*B01L 3/02*    (2006.01)
(Continued)

(52) U.S. Cl.
CPC ........ *G01N 33/5302* (2013.01); *B01L 3/0293* (2013.01); *B01L 13/00* (2019.08); *G01N 33/54326* (2013.01); *G01N 35/0098* (2013.01)

(58) Field of Classification Search
None
See application file for complete search history.

(56) References Cited

U.S. PATENT DOCUMENTS 5,482,863 A    1/1996    Knobel
5,482,864 A    1/1996    Knobel
(Continued)

FOREIGN PATENT DOCUMENTS

EP    500506 A1 *    8/1992    .............. B01L 99/00
EP    0733905 A2    9/1996
(Continued)

*Primary Examiner* — P. Kathryn Wright
(74) *Attorney, Agent, or Firm* — Dykema Gossett PLLC

(57)    ABSTRACT

Aspects of the present disclosure are directed to a device for carrying out heterogeneous immunoassays by means of magnetic particles in cuvettes lined up next to one another, wherein each cuvette has a filling opening and at least one lateral measurement window which is transparent to the measurement radiation. In one embodiment, the device includes at least one stationary cuvette array in which the cuvettes are arranged for receiving liquid media, at least one support arm which is movable along the cuvette array and which is lowerable toward the filling opening of a selected cuvette. The support arm having at least one aspirating needle which is lowerable toward the bottom of the cuvette, and also having at least one dispenser which can be positioned above or in the respective filling opening for dispensing the liquid media into the cuvette.

21 Claims, 10 Drawing Sheets

(51) Int. Cl.
*G01N 21/25* (2006.01)
*G01N 33/53* (2006.01)
*G01N 33/543* (2006.01)
*G01N 33/553* (2006.01)
*G01N 35/00* (2006.01)
*G01N 35/02* (2006.01)

(56) References Cited

U.S. PATENT DOCUMENTS

| | | | | |
|---|---|---|---|---|
| 5,610,069 | A * | 3/1997 | Clark | B01L 3/08 |
| | | | | 422/562 |
| 6,333,008 | B1 | 12/2001 | Leistner et al. | |
| 7,718,072 | B2 | 5/2010 | Safar et al. | |
| 11,635,443 | B2 * | 4/2023 | Limbach | G01N 33/54386 |
| | | | | 435/5 |
| 11,867,710 | B2 * | 1/2024 | Limbach | G01N 35/026 |
| 2009/0212235 | A1 * | 8/2009 | Patt | B01L 7/52 |
| | | | | 250/459.1 |
| 2014/0134620 | A1 * | 5/2014 | Tajima | G01N 21/76 |
| | | | | 435/6.12 |
| 2019/0040345 | A1 * | 2/2019 | Viljoen | C12M 1/3476 |

FOREIGN PATENT DOCUMENTS

| | | |
|---|---|---|
| WO | 2011058169 A1 | 5/2011 |
| WO | 2019010514 A1 | 1/2019 |

* cited by examiner

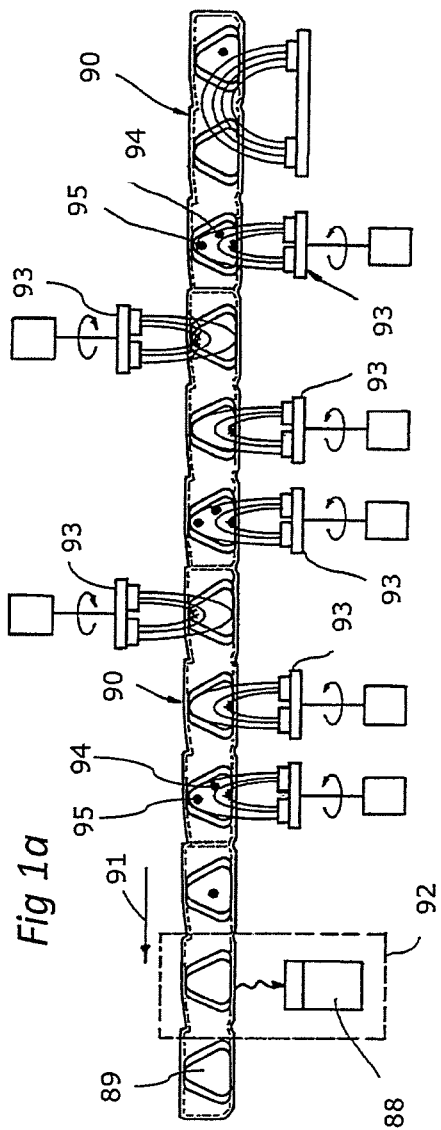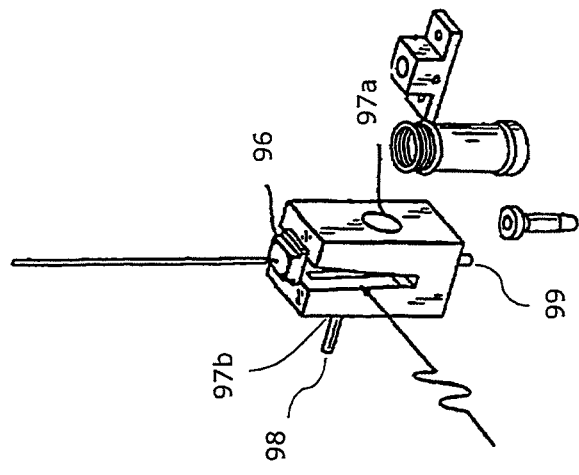

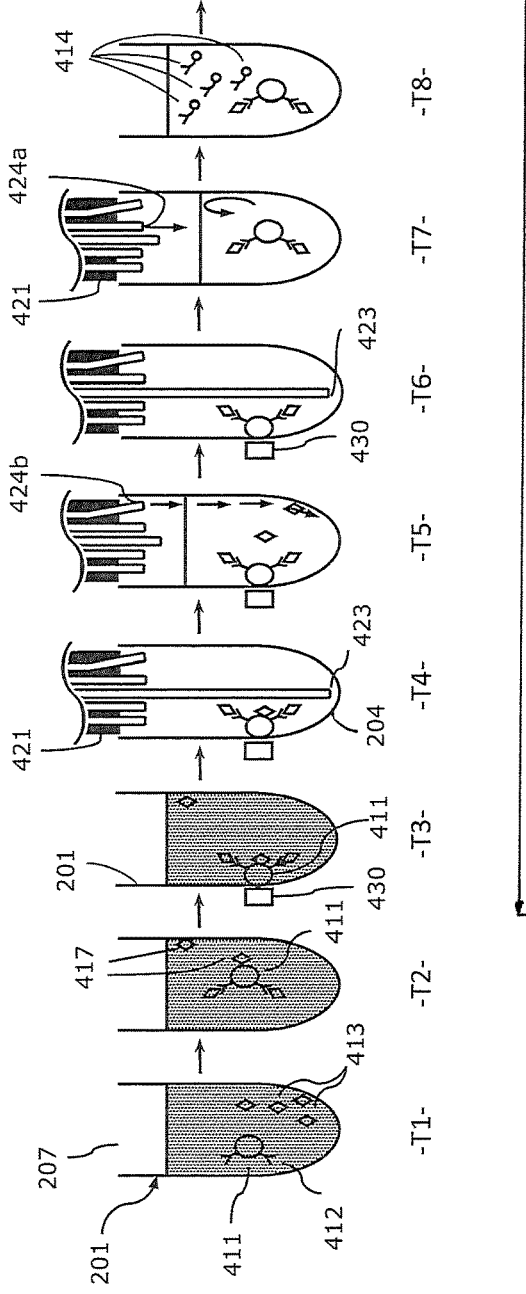
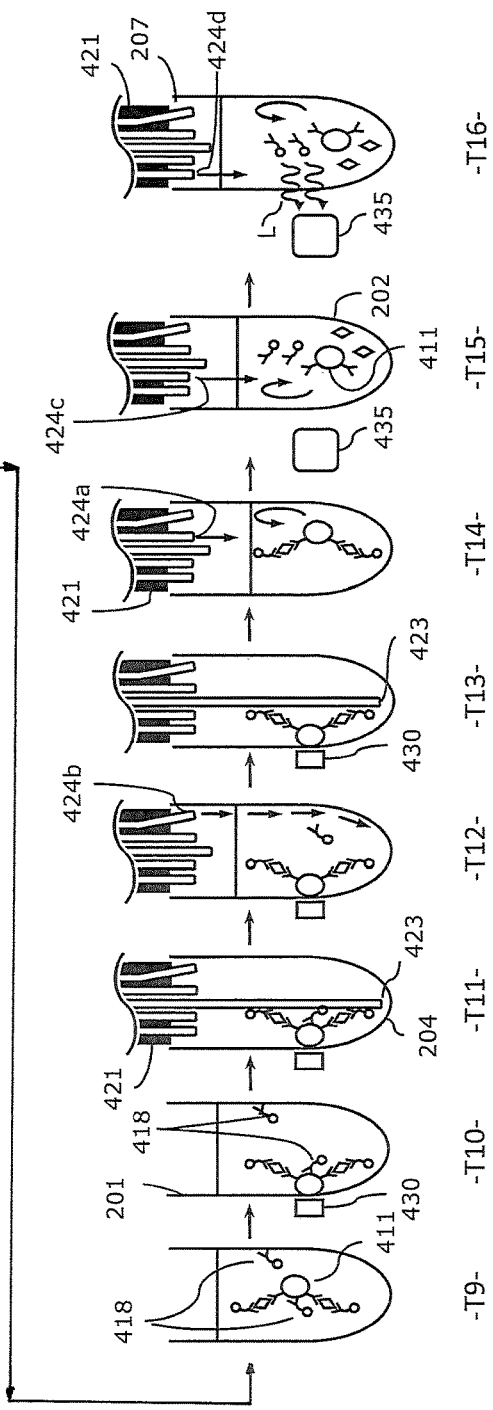
Fig. 4a

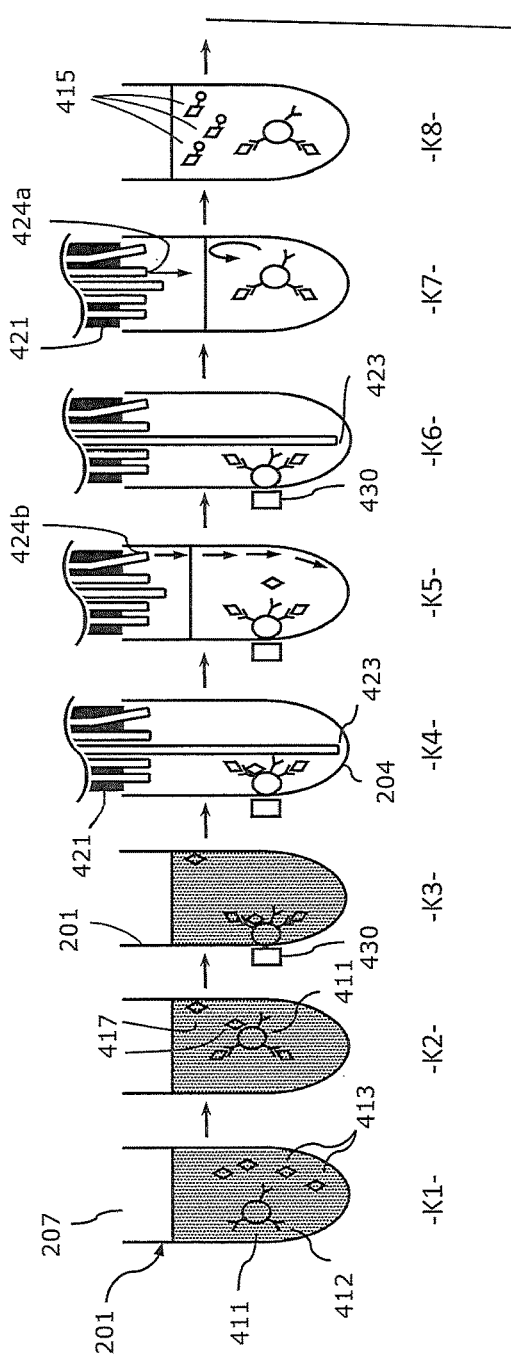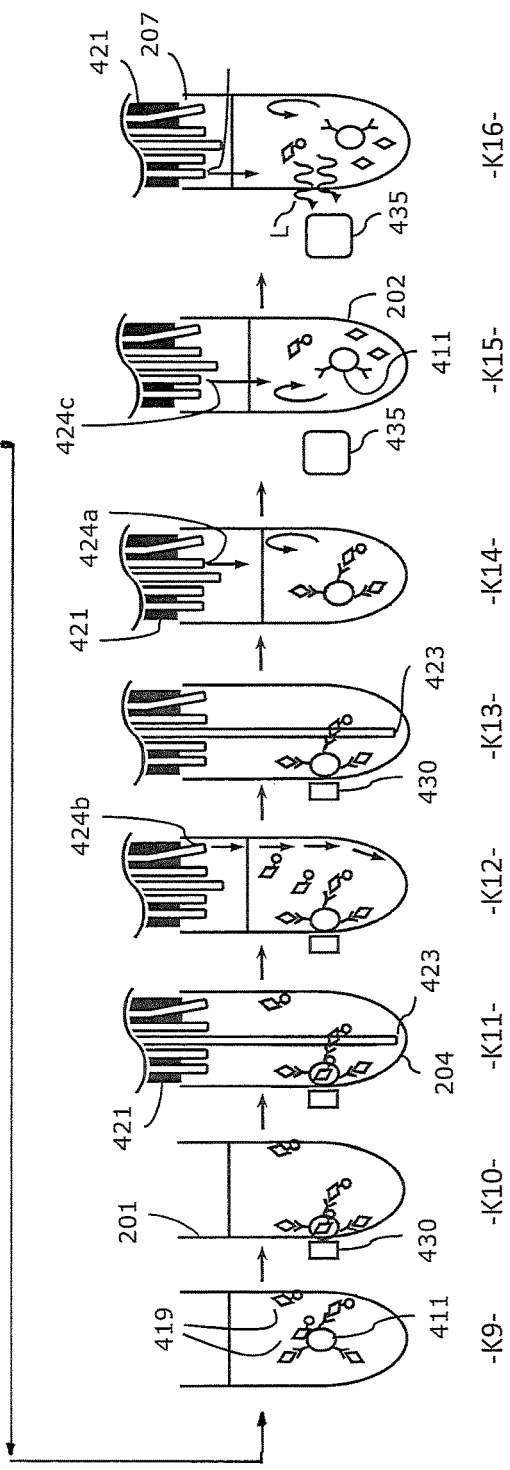
Fig. 4c

METHOD AND DEVICE FOR PERFORMING HETEROGENEOUS IMMUNOASSAYS

CROSS-REFERENCE TO RELATED APPLICATIONS

This application is a national stage filing based upon International application No. PCT/AT2019/060230, filed 11 Jul. 2019, which claims the benefit of priority to Austria application No. A 50603/2018, filed 13 Jul. 2018.

BACKGROUND

The invention relates to a method and a device for carrying out heterogeneous immunoassays by means of magnetic particles in lined-up cuvettes of an analyzer, wherein each cuvette has a filling opening and at least one lateral measurement window which is transparent to the measurement radiation.

Heterogeneous immunoassays are routinely used, for example in clinical diagnostics, analytics and microbiology, where there is a need to determine various properties and ingredients of liquid samples quickly, accurately and reproducibly, in particular using optical methods.

Various measurement principles are used in the known devices for carrying out heterogeneous immunoassays. In rotationally organized systems, devices are used which comprise a stationary detection unit, for example a stationary photomultiplier, and a conveying device, such as a conveyor belt or a carousel for example, for moving cuvettes for holding the reaction mixtures to be measured, consisting of samples and reagents. The cuvettes are successively moved past the detection unit in a rigid cycle and in a rigid order and are measured. Consequently, the conveying device has to stop whenever a new sample or a reagent is being introduced into a cuvette or the cuvette is to be replaced or washed and made available for a new test. The cycle times, which in this concept are rigidly predefined, are associated with a considerable loss of efficiency.

For a better understanding of the invention, a few essential technical terms used in the present application will be defined in greater detail:

Analyte/analyte molecule/antigen: An ingredient that is to be qualitatively and/or quantitatively determined in a sample is referred to here as an analyte—also referred to as an antigen in the case of immunoassays. In immunoassays, the analyte is in a liquid phase, usually dissolved in a buffer, in dilute body fluids or other sample liquids. In addition, the analyte may also be a particulate structure with antigenic surface features which is present in a suspension and which can be detected by immunoassays, such as for example bacteria, viruses, cells or material particles.

Luminescence/chemiluminescence: In analytical determination methods using luminescence (for example fluorescence, phosphorescence, chemiluminescence), the light emitted by molecules is measured. In the case of chemiluminescence, the light emission takes place as a result of a chemical reaction. Luminometric methods are highly sensitive and therefore are well-suited for detecting labels in immunoassays.

Immunoassay: The term immunoassay encompasses a number of bioanalytical methods, the common basic principle of which is that of recognizing and thus detecting an analyte (antigen) in a liquid phase by the binding of the analyte to an antibody. Immunoassays are used, for example, in laboratory medicine for determining a variety of analytes in various body fluids, such as blood, serum, urine or cerebrospinal fluid. They are used for the prognosis, diagnosis and progress monitoring of diseases and also for detecting toxins or monitoring medicinal substances in the body.

Competitive immunoassay: A competitive immunoassay is used to determine an analyte (antigen) if either only a single specific antibody is available for this or if the analyte does not have sufficient binding sites for the unhindered binding of two antibodies. By way of example, an antibody (capture antibody) is used as the recognition component, and an antigen labeled with a label is used as the competitive component.

Sandwich assay: To detect an analyte (antigen) by means of a non-competitive assay, which is also referred to as a sandwich assay, two different antibodies are required which recognize the analyte and do not hinder each other in terms of their binding to the analyte. Compared to the competitive immunoassay, one particular advantage of this lies in the sensitivity, which is higher in most applications.

Heterogeneous immunoassay: In a heterogeneous immunoassay of the present invention, in contrast to the homogeneous immunoassay, a change of liquid phase takes place during the process. When using magnetic particles with capture antibodies bound thereto for selective binding of the analyte (antigen), this may be achieved for example in that the particles are deposited on the vessel wall by a magnetic field, the first liquid is replaced by a second liquid, and the particles are resuspended in the second liquid. Once the first liquid has been removed, any washing steps can be carried out on the particles using the second liquid or a special washing liquid. The washing steps make it possible to remove substances which have bound non-specifically to the particles, as well as interfering substances present in the first liquid, wherein, by removing interfering substances, the assay becomes much more specific and sensitive and low detection limits and concentration ranges are achieved for the antigen to be determined.

Magnetic particles (magnetic beads): These are magnetic particles of typically a few μm in size, which are suspended in an aqueous buffer solution and which are coated with the capture antibody for immunochemical tests.

Capture antibody: These are antibodies which bind to at least one epitope of the analyte and which are bound to the solid phase-in the case of the present invention-on the surface of solid magnetic particles.

Tracer antibody (labeled antibody, conjugate): These are a second antibody, to which a labeling molecule (label) is chemically bound and which selectively binds to analyte molecules by way of antigen/antibody interactions during the assay.

Tracer antigen (labeled antigen): Antigen labeled with a label, which in the case of a competitive assay competes with the analyte for a binding site on the capture antibody molecules.

Label/labeling molecule: The labeling molecule may be a dye which emits light as a result of one or more chemical substances being added (chemiluminescence). Furthermore, the dye can also be caused to emit as a result of a voltage being applied (electroluminescence), or as a result of being irradiated with light (for example fluorescence). The labeling molecule may also catalyze a detection reaction, the reaction products of which can be detected, such as for example in the case of an enzymatic reaction (enzymatic immunoassay).

Bound/free washing, or (B/F) washing: A process step of a heterogeneous immunoassay, which involves separating the residue specifically bound to the solid phase (bound) and the unbound residue (free), the latter being removed in this washing step. The unbound residue may be the unbound matrix of the sample, the unbound excess of labeled tracer antibodies that have been added, or other excess constituents in the sample/reagent mixture.

Pipettor: A device for aspirating and then discharging a liquid that is to be transferred, said device being suitable for transferring liquid between a first and a second vessel and being able to move to different areas of the sample and reagent stores and also to the cuvettes.

Dispenser (or injector): A dispenser serves to dispense defined quantities of liquid from a storage vessel, via a supply line which ends in a nozzle, dispensing opening or dispenser needle, into a vessel, for example into a cuvette.

PRIOR ART

U.S. Pat. No. 6,333,008 B1 discloses a measurement arrangement which serves to carry out luminometric series analyses on liquid samples containing target substances to be detected and labeling substances which can be bound thereto in an immunochemical detection reaction, as well as magnetizable carrier particles. As shown in FIG. 1a of the present application, the liquid samples 89 are transported in wells of a multi-well cuvette 90 along a conveying path (see arrow 91) to an optical measurement station 92, wherein permanent magnets, which are designed as rotatable double magnets 93, and separation stations, which are intended to separate out excess labeling substance, act on the multi-well cuvette 90 while the latter is being transported. In each of the individual separation stations, a (B/F) washing step takes place by means of an injector 94 and an aspirating needle 95. In the measurement station 92, the luminescent radiation is detected by a photodetector 88. One disadvantage of the known measurement arrangement is the need to have to convey the liquid samples, during the analysis process, to different machine components which are distributed at fixed positions along a process path. In addition, certain components, such as permanent magnets designed as rotatable double magnets 93 and separation stations comprising injectors 94 and aspirating needles 95, must be provided multiple times.

Such devices are characterized in that all the processes are predefined by rigid clock cycles of the cuvette conveying mechanism and must take place in predetermined time windows. Actions such as dispensing, mixing, separating and measuring can take place only when the respective cuvettes are located at the positions of the respective device components.

For instance, a sample can be dispensed into an empty cuvette (not at any time but) only when the empty cuvette is moving past the position of the sample pipettor and the cuvette conveying mechanism stops at this position. A reagent or a washing liquid can be dispensed into a cuvette containing the sample only when the cuvette in question is moving past the position of the reagent dispenser and the cuvette conveying mechanism stops at this position. The same applies to the stirring of reaction mixtures consisting of the sample and the reagents in the cuvettes by mechanical stirring, and to the optical measurement at the position of the optical measurement device.

It is disadvantageous that, once the measurements have been completed, it is not immediately possible for a cuvette to be washed or replaced and for a new test to be started. A cuvette can be washed or replaced and thus made available for a new test only when the cuvette in question is located at the position of the cuvette washing station or of the cuvette changer and a washing stop or a cuvette change takes place or is provided at the position in question at a fixed point in time or for a fixed duration from the start of the test, according to the cycle times which in this concept are rigidly predefined. As a result, all the cuvettes are "blocked" for the same length of time, regardless of whether the measurement duration for the respective tests is short or long.

In devices for carrying out heterogeneous immunoassays, some process steps of an assay in an individual cuvette, such as for example separating the magnetic beads (>10 s), (B/F) washing (a few seconds), or antigen/antibody reactions or incubation (approx. 10-20 min), are particularly time-consuming, whereas for example a luminescence measurement at the respective machine station takes place relatively quickly (a few seconds). If a process step of an assay to be carried out in a cuvette is repeated, the machine component responsible for this has to be provided multiple times along the process path so as not to have to wait for a full movement cycle of the conveying mechanism.

Conventional devices with cuvettes moved in a stationary arrangement along a cyclical movement path from station to station cannot readily provide flexible timing of process steps in order to carry out analyses in different cuvettes in parallel, since the cuvettes can only move jointly on a cyclical conveying mechanism and the process steps are therefore carried out in rigid clock cycles.

The stationary distribution of machine components along a process path in the case of conveyor belts or carousels with moving samples, reagents and cuvettes results in relatively long throughput times for the individual tests and limits the number of tests that can be carried out per hour on a device having a certain number of cuvettes.

U.S. Pat. No. 7,718,072 B2 discloses a device for carrying out heterogeneous immunoassays. As shown in FIG. 1b of the present application, the cuvettes 96, which hold the sample, the necessary reagents and magnetic particles, are guided by a conveyor belt along a process path through a series of temperature-controllable structures, wherein each structure has a lateral opening 97a for access by a photomultiplier, a clearance 97b located opposite for a separation magnet 98 that can be brought up to the cuvette, and a mixer 99 acting in the bottom region of the cuvette 96. A plurality of such temperature-controllable structures for mixing, magnetically separating or measuring may be arranged in a stationary manner along the process path in order to enable the process steps of a heterogeneous immunoassay to be carried out in one or more cuvettes 96 in succession. Here, too, it is disadvantageous that the processes taking place at the stationary machine components are predefined by rigid clock cycles of the cuvette conveying mechanism and must take place in predetermined time windows.

SUMMARY OF THE INVENTION

Proceeding from the prior art outlined above, the object of the invention is to propose a method and a device for carrying out heterogeneous immunoassays, by which disadvantages are avoided, in particular with regard to the limited sample throughput of known systems due to processes which are defined by rigid clock cycles and which take place in predetermined time windows, and to propose improvements which increase the sample throughput without making the individual analysis or the device significantly more expensive, the quality of the analysis being at least maintained.

This object is achieved according to the invention by a device for carrying out heterogeneous immunoassays which is characterized by the following components:

- at least one stationary cuvette array, in which the cuvettes for holding liquid media (samples, reagents, suspensions, washing solutions) are arranged,
- at least one support arm which is movable along the cuvette array and which is lowerable toward the filling opening of a selected cuvette, said support arm having at least one aspirating needle which is lowerable toward the bottom of the cuvette, and also having at least one dispenser, which can be positioned above or in the respective filling opening, for dispensing the liquid media into the cuvette, wherein at least one dispenser is designed to dispense a washing solution for the magnetic particles,
- at least one magnet assembly for separating the magnetic particles on an inner surface of the cuvette, said magnet assembly being movable along the cuvette array and acting on the contents of the selected cuvette, and
- at least one optical detection device for receiving a measurement signal that correlates with (for example is directly or indirectly proportional to) an analyte concentration in the selected cuvette, said optical detection device being movable along the cuvette array and being alignable with the measurement window of the selected cuvette.

A first variant (two-step assay) of the method according to the invention for determining an analyte by means of a heterogeneous immunoassay is characterized in that, in a first step sequence A, firstly a) a sample for determining the analyte, and
b) a suspension of magnetic particles containing a capture antibody are pipetted into a selected cuvette of a stationary cuvette array, and in that the following steps B of an immunochemical analysis, such as c) incubating and stirring the cuvette contents,
d) separating the magnetic particles,
e) introducing and aspirating a washing solution one or more times,
f) pipetting in a tracer antibody or a tracer antigen and repeating steps d) and e),
g) adding a metered quantity of at least one trigger liquid, and
h) carrying out a luminometric measurement of the sample, take place by means of at least one measurement and manipulation module which is movable along the cuvette array and which is stopped at the selected cuvette in order to carry out some or all steps d), e), g) and h).

A second variant (single-step assay) of the method according to the invention for determining an analyte by means of a heterogeneous immunoassay is characterized in that, in a first step sequence A, firstly a) a sample for determining the analyte,
b) a suspension of magnetic particles containing a capture antibody, and
c) a tracer antibody or a tracer antigen are pipetted into a selected cuvette of a stationary cuvette array, and in that the following steps B of an immunochemical analysis, such as d) incubating and stirring the cuvette contents,
e) separating the magnetic particles,
f) introducing and aspirating a washing solution one or more times,
g) adding a metered quantity of at least one trigger liquid, and
h) carrying out a luminometric measurement of the sample, take place by means of at least one measurement and manipulation module which is movable along the cuvette array and which is stopped at the selected cuvette in order to carry out some or all steps e) to h).

With particular advantage, in particular those steps that are carried out using the movable measurement and manipulation module can take place fully automatically.

One particular advantage of the invention is that, while time-consuming steps for the immunochemical analysis, such as incubation, etc., are being carried out in the selected cuvette, the measurement and manipulation module can be moved to at least one further cuvette of the cuvette array in order to carry out some or all steps e) to h) of an immunochemical analysis in the further cuvette.

In particular, the measurement and manipulation module according to the invention can move freely between the cuvettes of the stationary cuvette array in order to carry out a second process step in another cuvette while an assay process step that does not have to be carried out by the components of the measurement and manipulation module is taking place in a first cuvette.

Before the measurement and manipulation module moves to a cuvette, or as it does so, the needle group of the dispensers and also the aspirating needle can be washed in a washing station which is arranged on the measurement and manipulation module.

For example, in a first parallelization example, during an incubation step of an assay in a first cuvette, a magnetic separation and (B/F) washing can be carried out in a second cuvette in order to increase the utilization of the machine components and to save time in carrying out the assays.

If an additional movable magnet assembly is present, which is movable along the cuvette array on a separate rail independently of the other components of the measurement and manipulation module, then in a second parallelization example a complete magnetic separation or partial pre-separation of beads of a third assay can be carried out in a third cuvette, while in a fourth assay of a fourth cuvette the process steps of luminescence triggering and luminescence measurement are being carried out using components of the measurement and manipulation module. The additional movable magnet assembly can be arranged on the side of the cuvette array located opposite the measurement and manipulation module and can be moved independently of the measurement and manipulation module.

According to one preferred embodiment variant of the invention, the support arm for the aspirating needle and the at least one dispenser has a lifting and rotating device which is arranged on a platform that is movable along the cuvette array, wherein a common suspension mount for the magnet assembly and the detection device is arranged on the movable platform.

It is particularly advantageous if the support arm arranged on the movable platform forms, along with the dispenser platform together with the magnet assembly and the detection device, a measurement and manipulation module which is movable along the cuvette array and which combines all the robotic, fluidic and metrological components for the process steps of magnetically separating the beads, so-called (B/F) washing, and also the triggering and measurement of the luminescence.

BRIEF DESCRIPTION OF THE DRAWINGS

The invention will be explained in greater detail below on the basis of an exemplary embodiment. In the figures:

FIG. 1a and FIG. 1b show two different devices for carrying out heterogeneous immunoassays according to the prior art, FIG. 4a shows a schematic process example of a two-step sandwich assay, FIG. 4c shows a schematic process example of a two-step competitive assay.

DETAILED DESCRIPTION

The devices shown in FIGS. 1a and 1b relate to examples from the prior art and have already been discussed at length in the introductory part of the description.

Parts which have the same function are provided with the same reference signs in the individual drawings of the invention.

Figure 2:
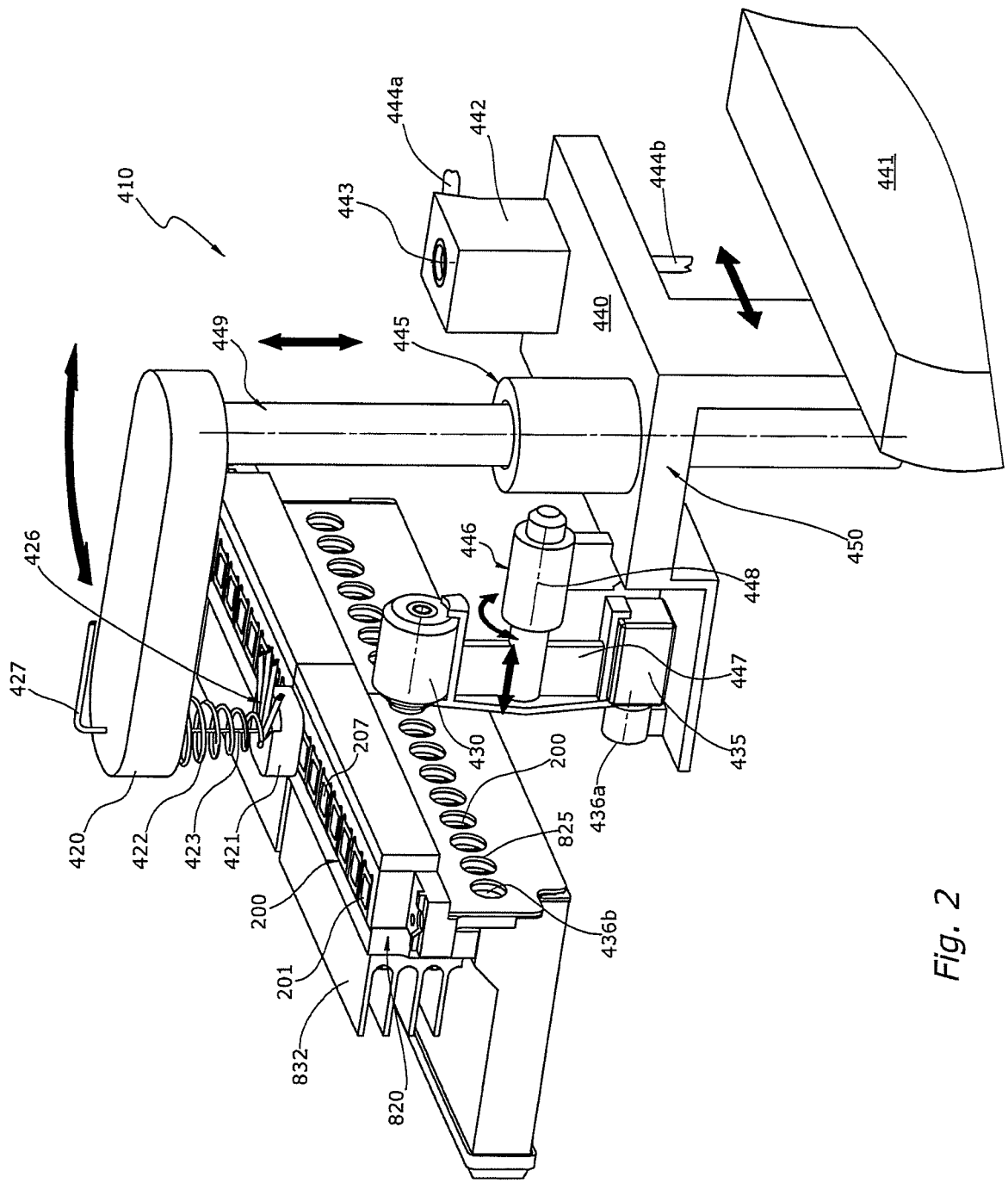
FIG. 2 shows a device according to the invention for carrying out heterogeneous immunoassays, in a three-dimensional view.
Figure 3:
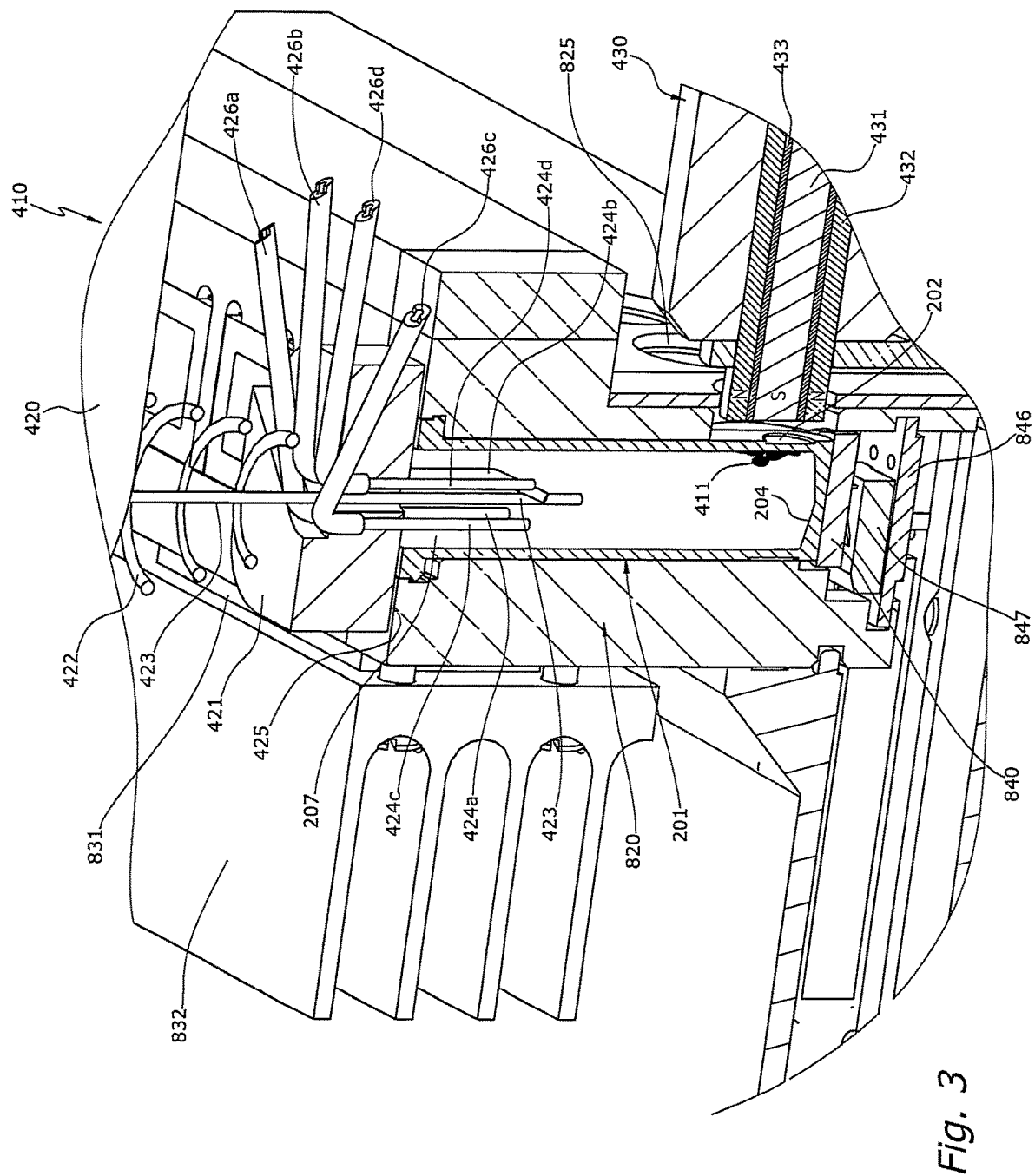
FIG. 3 shows a detail of the device according to FIG. 2, in an enlarged sectional view.

The device 410 according to the invention shown in FIGS. 2 and 3 is used to carry out heterogeneous immunoassays.

The device has a one-dimensional, stationary cuvette array 200, arranged for example in an analyzer, in which the cuvettes 201 for holding liquid media (samples, reagents, suspensions containing magnetic particles 411, washing solutions) are arranged in a temperature-controlled cuvette block 820.

A pivotable support arm 420 is designed to be movable along the cuvette array 200 and can be lowered toward the filling opening 207 of a cuvette 201 selected by the control logic of the device. The support arm 420 is equipped with an aspirating needle 423, which can be lowered toward the bottom 204 of the cuvette 201, together with an aspirating line 427, and also with at least one dispenser 424a to 424d which can be positioned above or in the respective filling opening 207 in order to dispense the liquid media into the cuvette 201. At least one dispenser 424a, 424b is designed to dispense a washing solution for the magnetic particles 411.

The supply lines to the dispensers 424a, 424b are denoted by 426; specifically, a washing line 426a leads to the dispenser 424a, a washing line 426b leads to the dispenser 424b, a supply line 426c leads to the dispenser for a pretrigger solution, and a supply line 426d leads to the dispenser 424d for a trigger solution.

A magnet assembly 430 for separating the magnetic particles 411 on an inner surface of the cuvette 201 is also provided, which is movable along the cuvette array 200 and acts on the contents of the selected cuvette 201, and also an optical detection device 435 which is movable along the cuvette array 200 and which can be aligned with the measurement window 202 of the selected cuvette 201 in order to obtain a measurement signal that correlates with (for example is directly or indirectly proportional to) the analyte concentration in the selected cuvette 201.

For the sake of simplicity, only those components of the device 410 which are essential to the present invention are shown, wherein analyzer components such as sample and reagent stores, pumps, valves, evaluation units, control units and drive units will not be discussed in detail.

The cuvette array 200 is arranged in a temperature-controllable cuvette block 820, wherein the Peltier elements 831 which are provided for controlling the temperature can be seen in particular in FIG. 3, these being arranged between the cooling fins 832 and the cuvette block 820. The cuvette block 820 has, on the front side, access openings 825 which align with the measurement windows 202 of the cuvettes 201. For mixing and controlling the temperature of the cuvette contents, an ultrasonic transducer 840 (for example a piezoelectric thickness-mode transducer) is attached to the bottom 204 of each cuvette 201, wherein the contact to a spring contact board 846 is established via contact blocks 847 having spring contacts.

Alternatively, the cuvette contents may be mixed for example by the aspirating needle 423, or by a manual or automatic pipettor which is used to introduce the sample and/or reagents, in that the liquid in a cuvette 201 is homogenized by repeatedly aspirating and discharging at least a portion of the liquid volume, introducing the samples and/or reagents at a high flow rate, or suitably combining said measures.

Further alternative devices for mixing the cuvette contents may include plunging a stirring shaft into the cuvette, as well as stirring by means of a horizontal orbital movement of the cuvette block 820 or by means of a pipetting needle which dips into the cuvette.

A dispenser platform 421, which can be lowered onto the filling opening 207 of the cuvette 201 and which in the example shown has four dispensers 424a to 424d for dispensing liquid media into the cuvette 201, is attached to a flexible mount (see spring element 422) on the movable support arm 420. The aspirating needle 423 attached to the support arm 420 passes through a central opening in the dispenser platform 421 so that said aspirating needle can be lowered to the bottom 204 of the cuvette 201 once the dispenser platform 421 has been placed onto the filling opening 207 of the cuvette 201.

The dispenser platform 421 has, on the side facing toward the cuvette 201, a sealing surface 425 or a form-fitting partition made of a material that is impervious to light, so that, when the dispenser platform 412 is lowered, it is not possible for ambient light to enter while the cuvette contents are being optically measured.

According to the invention, a dispenser 424a for dispensing a washing solution for the magnetic particles 411 has an outflow direction which is oriented substantially parallel to the longitudinal axis of the cuvette 201 (straight washing needle), and a second dispenser 424b—also for dispensing a washing solution—has an outflow direction which is directed onto an inner lateral surface of the cuvette 201 (angled washing needle).

Of two further dispensers 424c, 424d of the dispenser platform 412, the outflow directions of which are oriented substantially parallel to the longitudinal axis of the cuvette 201, optionally a third dispenser 424c is designed to dispense a pretrigger solution and a fourth dispenser 424d is designed to dispense a trigger solution. For immunoassays based on chemiluminescence, which require only a trigger solution, the third dispenser 424c may remain unused or may be omitted.

The exemplary embodiment shown in FIGS. 2 and 3 is characterized by a platform 440 which is movable along the cuvette array 200 and which has a lifting and rotating device 445, by which the support arm 420 together with the aspirating needle 423 and the dispensers 424a to 424d of the dispenser platform 421 can be lowered. Preferably, a common suspension mount 446 for the magnet assembly 430 and the detection device 435 is also arranged on the movable platform 440, so that a movable measurement and manipulation module 450 is realized, which combines all the robotic, fluidic and metrological components for the process steps of magnetically separating the beads, so-called (B/F) washing, and also triggering and measuring the luminescence.

The movable platform 440 of the measurement and manipulation module 450 is connected to the frame of the device 410 via a lateral rail 441 extending parallel to the cuvette array 200, and can be brought to the position of a selected cuvette 201 via a movement mechanism such as, for example, a stepper-motor-driven toothed belt, a spindle, or a linear motor. For supplying power to and controlling the measurement and manipulation module 450, flexible electrical and fluidic connection lines, for example in the form of so-called energy chains (not shown), can be led to the platform 440.

According to one embodiment variant, a washing station 442 for the aspirating needle 423 and the at least one dispenser 424a to 424d of the dispenser platform 421 may also be arranged on the movable platform 440, the support arm 420 being lowerable onto the opening 443 of said washing station following a rotational movement, so that the entire needle group on the head of the pivotable support arm 420 can be introduced into the opening 443.

The needle washing station 442 has an upper aspirating line 444a, which limits the fill level, and a lower aspirating line 444b. In this case, a movement toward the opening 443 is possible by an up and down movement with a 90° rotation while simultaneously lowering the support arm 420 below the upper edge of the cuvette array 200, as a result of which other robotic components, for example any pipettors, etc., can move unhindered along the cuvette array 200.

The pivotable support arm 420 of the measurement and manipulation module 450 is attached to a tower 449 which is pivotable through 90° in a horizontal plane and is additionally movable in the vertical direction, wherein the pivoting movement is enabled by a rotary actuator, which is driven for example by a stepper motor. In addition, the tower is equipped with a lifting device which comprises, for example, a stepper-motor-driven spindle or a toothed belt for generating a vertical translational movement of the support arm 420. The two types of movement can be integrated in the combined lifting and rotating device 445 at the base of the vertical tower 449.

One embodiment variant may also consist in that the needle washing station is positioned in a stationary manner at the end of the cuvette array 200, wherein the support arm of the needle group need not be pivotable in this variant.

According to one preferred embodiment variant, the common suspension mount 446 for the magnet assembly 430 and the detection device 435 is suitable for carrying out a translational or rotational movement in order to swap the positions of the magnet assembly 430 and the detection device 435 in front of the selected cuvette 201.

By way of example, the magnet assembly 430 and the detection device 435 may be attached to a rotor arm 447, which is mounted in the suspension mount 446, at an equal distance from a common axis of rotation 448.

In this case, the rotor arm 447 mounted in the suspension mount 446 may preferably be designed to be movable in translation in the direction of the axis of rotation 448, in order to move the magnet assembly 430 or the detection device 435 toward the access opening 825 in the cuvette block 820 and thus toward the measurement window 202 of the selected cuvette 201. The photomultiplier 435 and also the magnet assembly 430 can be aligned, with their respective optical main axis or pole axis, with the relevant access opening 825 in the cuvette block and by way of a horizontal movement can dock onto the respective opening in a manner sealed against the ingress of light, or can be optimally moved toward the wall of the cuvette 201 in order to generate a magnetic flux density that is as high as possible.

The magnet assembly 430 may consist of one or more magnets, which are preferably rare-earth magnets of high field strength, such as for example $Nd_2Fe_{14}B$ (neodymium iron borate), but may also be designed as electromagnets. The magnet assembly 430 is preferably formed of neodymium rod magnets with two different rod radii, wherein an inner rod 431 is substantially enclosed by an outer, hollow-cylindrical rod 432, with the interposition of a non-magnetic intermediate layer 433, and the two rods of different length and diameter have a conical transition. The assembly ends in a slim end region with a point-type high magnetic flux density, which end region can be brought close to the window 202 of the cuvette 201 through the opening 825 in the cuvette block 820. The magnet assembly 430 may also be composed of a plurality of individual magnets in order to increase the magnetic field strength and/or magnetic field gradients necessary for the magnetic separation onto a cuvette wall, or to reduce stray fields in the neighboring cuvettes. One example of a magnet assembly is shown in FIG. 3, wherein a bipolar end of a concentric magnet assembly 430 having a non-magnetic intermediate layer 433 is directed toward the cuvette 201.

According to one embodiment variant, the device may have a second magnet assembly (not shown), which is movable along the cuvette array 200 on a separate rail and acts on the contents of a selected cuvette 201, in order to act on the cuvettes 201 from the other side of the cuvette block 820. There is no imperative need here for a second opening which is comparable to the first access opening 825 of the cuvettes 201, since the magnetic field lines of the second magnet assembly are able to act through the non-ferromagnetic material of the cuvette block (aluminum). The second magnet assembly can carry out or prepare for individual process steps, and thus the overall throughput of the device can be increased. For example, a magnetic separation can simultaneously be carried out on another cuvette in order to separate beads for a washing step of a second assay in the other cuvette. The necessary washing steps can thereafter be carried out in a time-saving manner by the measurement and manipulation module 450.

The second magnet assembly may consist both of one or more electromagnets and also of permanent magnets, wherein, in the case of permanent magnets, an actuator must be provided in order to move the magnetic assembly selectively toward or away from the cuvette. The actuator mechanism may be designed in a manner analogous to that for the first magnet assembly 430 and may have, in a known manner, a belt drive, a drive spindle or a solenoid.

The detection device 435 is preferably realized by a compact photomultiplier and serves to measure the quantity of light during the chemiluminescence triggered by adding the two trigger solutions, and may be equipped with a Peltier cooling device in order to obtain a more constant, lowernoise signal. To avoid extraneous light during the measurement at one of the access openings 825 of the cuvette block 820, the access openings 825 and the light inlet opening of the photomultiplier may have concentrically stepped contact surfaces at the edge of the two openings. In addition, a shutter, which is actuated for example mechanically, may be provided in order to protect the photomultiplier in the rest state against the ingress of ambient light.

To measure the luminescence in the case of a low analyte concentration, use is preferably made of a digital photomultiplier which, for each incoming photon, triggers and releases a digital pulse of 10 ns. These short pulses are counted by the FPGA of the HetIA controller 460 (see FIG. 6) and are summed as a count over a settable sampling time. As long as the number of photons is small, the irregularly generated pulses can be output individually; the number of pulses per unit of time then corresponds to the number of photons per unit of time.

According to the invention, a reference light source 436a for the detection device 435 may be arranged on the movable platform 440. The reference light source 436a serves to calibrate the photomultiplier and has a light outlet opening which is oriented in the direction of the inlet opening of the detection device 435 (for example photomultiplier). The reference light source 436a may be arranged at any point along the line of movement of the detection device 435, but ideally such that a calibration of the photomultiplier takes place when the magnet assembly 430 is located exactly in front of the respective access opening 825 of the cuvette block 820.

As an alternative to this variant, a reference light source 436b may also be arranged in a stationary manner at the end of the cuvette block 820 and may have a light outlet opening along the access openings of the cuvette block 820, as a result of which the temperature control device of the latter can also be used for the reference light source 436b.

In addition to a variant 1, which has been described above, in which all four dispensers 424a to 424d of the dispenser platform 421 are lowered with their needle tips into the cuvette 201 simultaneously, further variants are also conceivable.

Variant 2: The vertically movable and rotatable tower 449 may have a plurality of support arms 420 (not shown).

In order to lower individual dispensers 424a to 424d or pairs of dispensers 424a/424b and 424c/424d into the cuvette 201, the tower 449 may be designed such that it has a plurality of (up to four) support arms 420 attached radially at the upper end. Two support arms 420 may be arranged for example at an angle of 90°, or opposite one another at an angle of 180°. Located at each free end of the support arms 420 is a platform, which is comparable to the dispenser platform 421 and has in each case one or two of the dispensers 424a to 424d and preferably in each case a lowerable aspirating needle 423. The tower 449 may be divided in cross-section into a plurality of segments which are independently movable vertically, each of said segments carrying a support arm 420 so that it is possible, by means of the lifting and rotating device 445, to lower only that segment that has its support arm located above a cuvette 201.

Several process examples of heterogeneous immunoassays are shown by way of example in FIGS. 4a to 4d.

The present examples of heterogeneous immunoassays relate to the necessary machine processes for automatically carrying out, according to the invention, so-called "sandwich assays" and "competitive assays", both of which can be implemented as "one-step" assays or "two-step" assays.

In the case of a sandwich assay with chemiluminescence measurement, the analyte molecule forms, by antigen/antibody interactions, a bridge between a first antibody (capture antibody), which is immobilized on a carrier, for example the surface of the magnetic particles, and a second antibody to which signal molecules are bound (tracer antibody), and after adding a pretrigger liquid and a trigger liquid this gives rise to a chemiluminescence which lasts a few seconds and which is proportional to the quantity of analyte. The two types of antibody are in excess compared to the analyte. In the case of analyte molecules which are too small to have binding sites for two different antibodies, so-called competitive immunoassays are used, wherein the tracer antibodies compete directly with the analyte molecules for binding sites on an antibody immobilized on a carrier.

Two-Step Sandwich Assay

In a two-step sandwich assay shown in FIG. 4a, firstly the sample (which contains the analyte 413) and a suspension of magnetic particles 411 (magnetic beads) with a coating of a capture antibody 412 are pipetted into the cuvette 201 by means of a pipettor (not shown here) (TI, in FIG. 4a).

During the subsequent incubation (approximately 3-20 min) at 37° C., the solution is mixed for example by means of ultrasound in order to prevent the particles from sinking and agglomerating and to ensure a thorough mixing of all the components. After the incubation, the analyte molecules 413 are bound to the capture antibodies 412, which are immobilized on the particles 411. There are also non-specifically bound analyte molecules 417 on the particle surface and/or the cuvette wall (T2, in FIG. 4a).

The particles 411 together with the substances bound thereto are fixed to the inner wall of the cuvette 201 by means of the magnet assembly 430 (T3, in FIG. 4a).

Once the particles have been fixed, substantially all the liquid is removed by the aspirating needle 423 lowered from the dispenser platform 421 (T4, in FIG. 4a).

Thereafter, a washing solution is introduced through a dispenser needle 424b, which is directed at an angle onto the inner wall of the cuvette 201, in order to remove, by careful rinsing, any excess constituents remaining on and/or adhering non-specifically to the particles 411 and/or the inner wall of the cuvette, the particles 411 still being magnetically held on the vessel wall (T5, in FIG. 4a).

The cuvette 201 is then aspirated again until dry, the particles 411 together with the substances bound thereto still being magnetically fixed to the inner wall of the cuvette 201 (T6, in FIG. 4a).

In contrast, a second, vertically oriented dispenser needle 424a, as it injects washing solution or dilution liquid, generates turbulence in the liquid so that the particles 411 are resuspended in the liquid when the magnets are undocked (T7, in FIG. 4a).

After the washing steps (T4-T7) and following a final aspiration, a solution of the tracer antibody 414 is pipetted into the cuvette 201 by means of a pipettor (not shown here) (T8, in FIG. 4a).

During the subsequent incubation (approximately 3-6 min) at 37° C., the solution is mixed for example by means of ultrasound in order to prevent the particles 411 from sinking and agglomerating and to ensure a thorough mixing of all the components. At the end of the incubation phase, the analyte molecules 413 are bound in a "sandwich-like" manner between the capture antibody 412, which is immobilized on the particles 411, and the added tracer antibody 414. There are also non-specifically bound tracer antibodies 418 on the particle surface and/or the cuvette wall (T9, in FIG. 4a).

The particles 411 together with the substances bound thereto are then fixed to the inner wall of the cuvette 201 by means of the magnet assembly 430 (T10, in FIG. 4a).

Once the particles 411 have been fixed, substantially all the liquid is removed by the aspirating needle 423 lowered from the dispenser platform 421 (T11, in FIG. 4a).

Thereafter, a washing solution is introduced through a dispenser needle 424b, which is directed at an angle onto the inner wall of the cuvette 201, in order to remove, by careful rinsing of the particles 411, any excess constituents remaining on and/or adhering non-specifically to the particles 411 and/or the inner wall of the cuvette, the particles 411 still being magnetically held on the vessel wall (T12, in FIG. 4a).

The cuvette 201 is then aspirated again until dry, the particles 411 together with the substances bound thereto still being magnetically fixed to the inner wall of the cuvettes 201 (T13, in FIG. 4a).

In contrast, a second, vertically oriented dispenser needle 424a, as it injects washing solution or dilution liquid, generates turbulence in the liquid so that the particles 411 are resuspended in the liquid when the magnets are undocked (T14, in FIG. 4a).

After these washing steps (T11-T14) and following a final magnetic separation and aspiration (not shown), the photomultiplier 435 is moved toward the cuvette 201. Then firstly pretrigger solution (T15, in FIG. 4a) and after a contact time (approximately 5 seconds) trigger solution (T16, in FIG. 4a) are supplied through the two dispensers 424c and 424d. A chemiluminescence L lasting only a few seconds (flash luminescence) is thus triggered, which is measured by the photomultiplier 435. The dispenser platform 421 of the support arm, which is placed onto the filling opening 207 of the cuvette 201 for this purpose, at the same time ensures the necessary darkening of the cuvette 201.

Single-Step Sandwich Assay

Figure 4B:
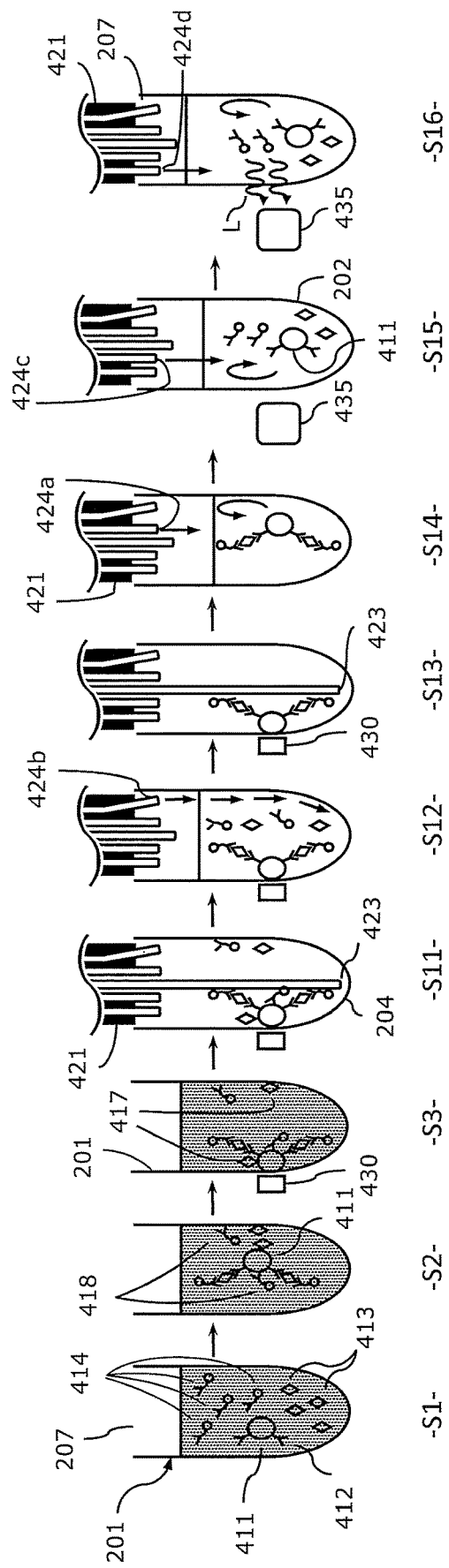
FIG. 4b shows a schematic process example of a single-step sandwich assay.

In a single-step sandwich assay shown in FIG. 4b, firstly the sample (which contains the analyte 413), a suspension of magnetic particles 411 with a coating of a capture antibody 412, and a solution of the tracer antibody 414 are pipetted into the cuvette 201 by means of a pipettor (not shown here) (S1, in FIG. 4b).

During the subsequent incubation (approximately 10 min) at 37° C., the solution is stirred for example by means of ultrasound in order to prevent the beads from sinking and agglomerating and to ensure a thorough mixing of all the components. After the incubation, the analyte molecules 413 are bound in a "sandwich-like" manner between a capture antibody 412, which is immobilized on the particles 411, and a tracer antibody 414. There are also non-specifically bound analyte molecules 417 and tracer antibodies 418 on the particle surface and/or the cuvette wall (S2, S3 in FIG. 4b).

The particles 411 together with the substances bound thereto are fixed to the inner wall of the cuvette 201 by means of the magnet assembly 430 (S3, in FIG. 4b).

The steps corresponding to steps T4 to T10 shown in FIG. 4a are omitted in the case of a single-step sandwich assay.

Once the particles 411 have been fixed, substantially all the liquid is removed by the aspirating needle 423 lowered from the dispenser platform 421 (S11, in FIG. 4b).

Thereafter, a washing solution is introduced through a dispenser needle 424b, which is directed at an angle onto the inner wall of the cuvette 201, in order to remove, by careful rinsing of the particles, any excess constituents remaining on and/or adhering non-specifically to the particles 411 and/or the inner wall of the cuvette, the particles 411 still being magnetically held on the vessel wall (S12, in FIG. 4a).

The cuvette 201 is then aspirated again until dry, the particles 411 together with the substances bound thereto still being magnetically fixed to the inner wall of the cuvettes 201 (S13, in FIG. 4b).

In contrast, a second, vertically oriented dispenser needle 424a, as it injects washing solution or dilution liquid, generates turbulence in the liquid so that the particles 411 are resuspended in the liquid when the magnets are undocked (S14, in FIG. 4b).

After these washing steps (S11-S14) and following a final magnetic separation and aspiration (not shown), the photomultiplier 435 is moved toward the cuvette 201. Then firstly pretrigger solution (S15, in FIG. 4b) and after a contact time (approximately 5 seconds) trigger solution (S16, in FIG. 4b) are supplied through the two dispensers 424c and 424d. A chemiluminescence L lasting only a few seconds (flash luminescence) is thus triggered, which is measured by the photomultiplier 435. The dispenser platform 421 of the support arm, which is placed onto the filling opening 207 of the cuvette 201 for this purpose, at the same time ensures the necessary darkening of the cuvette 201.

Two-Step Competitive Assay

In the two-step competitive assay shown in FIG. 4c, firstly the sample (which contains the analyte 413) and a suspension of magnetic particles 411 with a coating of a capture antibody 412 are pipetted into the cuvette 201 by means of a pipettor (not shown here) (K1, in FIG. 4c).

During the subsequent incubation (approximately 3-20 min) at 37° C., the solution is stirred for example by means of ultrasound in order to prevent the particles from sinking and agglomerating and to ensure a thorough mixing of all the components. After the incubation, the analyte molecules are bound to the capture antibodies 412, which are immobilized on the particles 411. There are also non-specifically bound analyte molecules 417 on the particle surface and/or the cuvette wall (K2, in FIG. 4c).

The particles 411 together with the substances bound thereto are fixed to the inner wall of the cuvette 201 by means of the magnet assembly 430 (K3, in FIG. 4c).

Once the particles have been fixed, substantially all the liquid is removed by the aspirating needle 423 lowered from the dispenser platform 421 (K4, in FIG. 4c).

Thereafter, a washing solution is introduced through a dispenser needle 424b, which is directed at an angle onto the inner wall of the cuvette 201, in order to remove, by careful rinsing of the particles 411, any excess constituents remaining on and/or adhering non-specifically to the particles 411 and/or the inner wall of the cuvette, the particles 411 still being magnetically held on the vessel wall (K5, in FIG. 4c).

The cuvette 201 is then aspirated again until dry, the particles 411 together with the substances bound thereto still being magnetically fixed to the inner wall of the cuvettes 201 (K6, in FIG. 4c).

In contrast, a second, vertically oriented dispenser needle 424a, as it injects washing solution or dilution liquid, generates turbulence in the liquid so that the particles 411 are resuspended in the liquid when the magnets are undocked (K7, in FIG. 4c).

After the washing steps (K4-K7) and following a final magnetic separation and aspiration (not shown), a solution of tracer antigen 415 is pipetted into the cuvette 201 by means of a pipettor (not shown here) (K8, in FIG. 4c).

At the start of the subsequent incubation (approximately 3-6 min) at 37° C., the solution is stirred for example by means of ultrasound in order to prevent the particles 411 from sinking and agglomerating and to ensure a thorough mixing of all the components. In addition to the analyte molecules 413, now also the tracer antigen molecules 415 are bound to the remaining binding sites of the capture antibodies 412, which are immobilized on the particles 411. There are also non-specifically bound tracer antigens 419 on the particle surface and/or the cuvette wall (K9, in FIG. 4c).

The particles 411 together with the substances bound thereto are then fixed to the inner wall of the cuvette 201 by means of the magnet assembly 430 (K10, in FIG. 4c).

Once the particles have been fixed, substantially all the liquid is removed by the aspirating needle 423 lowered from the dispenser platform 421 (K11, in FIG. 4c).

Thereafter, a washing solution is introduced through a dispenser needle 424b, which is directed at an angle onto the inner wall of the cuvette 201, in order to remove, by careful rinsing of the particles 411, any excess constituents remaining on and/or adhering non-specifically to the particles 411 and/or the inner wall of the cuvette, the particles 411 still being magnetically held on the vessel wall (K12, in FIG. 4c).

The cuvette 201 is then aspirated again until dry, the particles 411 together with the substances bound thereto still being magnetically fixed to the inner wall of the cuvettes 201 (K13, in FIG. 4c). Steps K12 and K13 can be repeated as often as required.

In contrast, a second, vertically oriented dispenser needle 424b, as it injects washing solution or dilution liquid, generates turbulence in the liquid so that the particles 411 are resuspended in the liquid when the magnets are undocked (K14, in FIG. 4c).

After these washing steps (K11-K14) and following a final magnetic separation and aspiration (not shown), the photomultiplier 435 is moved toward the cuvette 201. Then firstly pretrigger solution (K15, in FIG. 4c) and after a contact time (approximately 5 seconds) trigger solution (K16, in FIG. 4c) are supplied through the two dispensers 424c and 424d. A chemiluminescence L lasting only a few seconds (flash luminescence) is thus triggered, which is measured by the photomultiplier 435. The dispenser platform 421 of the support arm, which is placed onto the filling opening 207 of the cuvette 201 for this purpose, at the same time ensures the necessary darkening of the cuvette 201.

Single-Step Competitive Assay

Figure 4D:
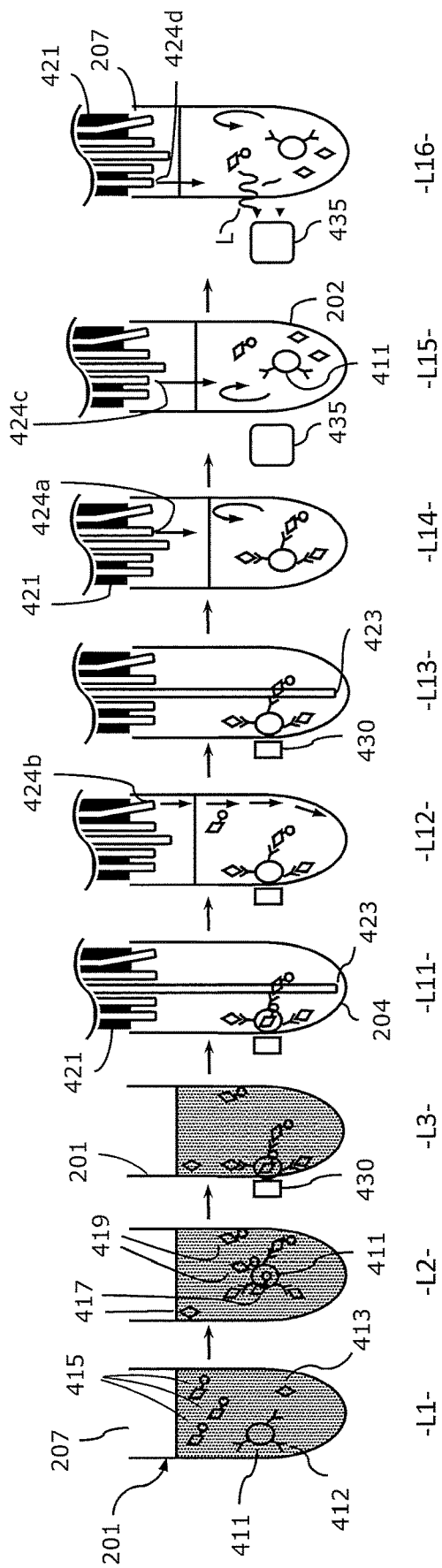
FIG. 4d shows a schematic process example of a single-step competitive assay.

In a single-step competitive assay shown in FIG. 4d, firstly the sample (which contains the analyte 413), a suspension of magnetic particles 411 with a coating of a capture antibody 412, and a solution of the tracer antigen 415 are pipetted into the cuvette 201 by means of a pipettor (not shown here) (L1, in FIG. 4d).

During the subsequent incubation (approximately 10 min) at 37° C., the solution is stirred for example by means of ultrasound in order to prevent the particles from sinking and agglomerating and to ensure a thorough mixing of all the components. During the incubation phase, the analyte molecules 413 compete with the tracer antigen molecules 415 for the free binding sites of the capture antibody molecules 412 bound to the particles 411, and after the incubation phase are bound thereto in a manner corresponding to their concentration ratio. There are also non-specifically bound analyte molecules 417 and tracer antigens 419 on the particle surface and/or the cuvette wall (L2, in FIG. 4d).

The particles 411 together with the substances bound thereto are then fixed to the inner wall of the cuvette 201 by means of the magnet assembly 430 (L3, in FIG. 4d).

Once the particles 411 have been fixed, substantially all the liquid is removed by the aspirating needle 423 lowered from the dispenser platform 421 (L11, in FIG. 4d).

Thereafter, a washing solution is introduced through a dispenser needle 424b, which is directed at an angle onto the inner wall of the cuvette 201, in order to remove, by careful rinsing of the particles 411, any excess constituents remaining on and/or adhering non-specifically to the particles 411 and/or the inner wall of the cuvette, the particles 411 still being magnetically held on the vessel wall (L12, in FIG. 4d).

The cuvette 201 is then aspirated again until dry, the particles 411 together with the substances bound thereto still being magnetically fixed to the inner wall of the cuvettes 201 (L13, in FIG. 4d).

In contrast, a second, vertically oriented dispenser needle 424a, as it injects washing solution or dilution liquid, generates turbulence in the liquid so that the particles 411 are resuspended in the liquid when the magnets are undocked (L14, in FIG. 4d).

After these washing steps (L11-L14) and following a final magnetic separation and aspiration (not shown), the photomultiplier 435 is moved toward the cuvette 201. Then firstly pretrigger solution (L15, in FIG. 4d) and after a contact time (approximately 5 seconds) trigger solution (L16, in FIG. 4d) are supplied through the two dispensers 424c and 424d. A chemiluminescence L lasting only a few seconds (flash luminescence) is thus triggered, which is measured by the photomultiplier 435. The dispenser platform 421 of the support arm, which is placed onto the filling opening 207 of the cuvette 201 for this purpose, at the same time ensures the necessary darkening of the cuvette 201.

The washing steps T5 to T6, T12 to T13, S12 to S13, K5 to K6, K12 to K13 and L12 to L13 can be repeated as required.

After the measurements (T16, S16, K16, L16), the used cuvette 201 is emptied by the aspirating needle 423 and either is replaced by a disposable cuvette or is cleaned and reused, so that a new immunoassay can take place in the previously used cuvette position.

The cuvette can be washed by introducing washing liquid through the dispensing needles 424a and/or 424b and emptying and drying the cuvette by means of the aspirating needle 423.

To wash the cuvette, use is preferably made of a cuvette washer (not described in detail here) which is movable along the cuvette array on its own movement rail.

In principle, however, it is also possible for other, somewhat modified immunoassays, which have a magnetic separation with (B/F) washing as a process step, to be carried out using the device according to the invention, wherein optionally a different detection method than measuring the chemiluminescence may be provided for the detection.

Figure 5:
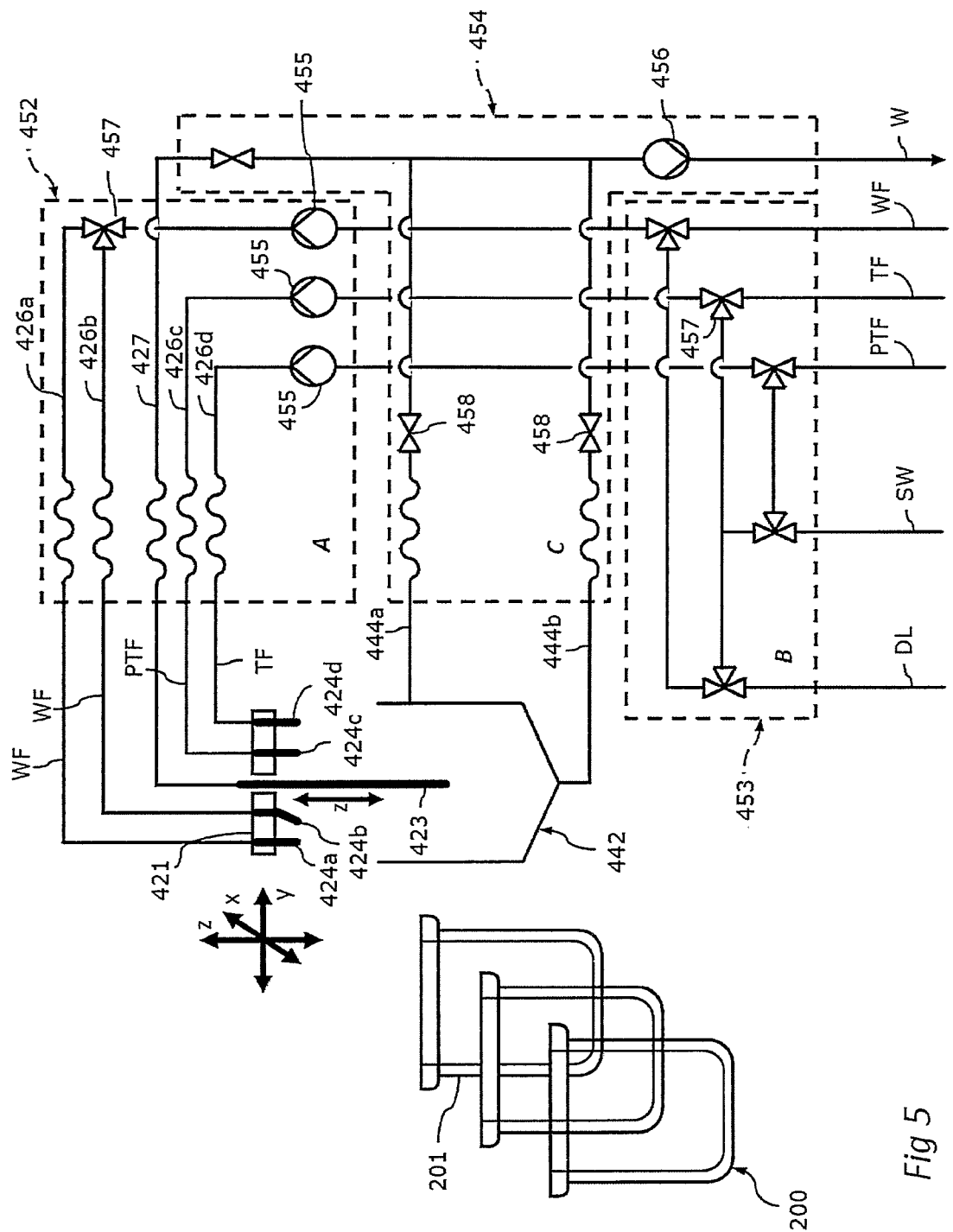
FIG. 5 shows a fluid circuit diagram of the device according to FIG. 2.

As shown schematically in FIG. 5, the movable measurement and manipulation module 450 of the invention has a fluidic system 451 for supplying the dispenser platform 421 with washing liquid WF, pretrigger liquid PTF, trigger liquid TF and compressed air DL. Devices for aspirating reaction mixture or washing liquid out of the cuvettes 201 of the cuvette array 200 and also the container, or washing trough, of the washing station 442 are also provided.

The fluidic system 451 is controlled via the HetIA controller 460 (see FIG. 6) and comprises a series of magnetically operable 3-way valves 457 and precision piston pumps as dispensing pumps 455, which are connected to the movable platform 440 (see FIG. 2) via flexible hose connections (indicated by wavy lines).

The dispenser platform 421, which is movable in the x-, y- and z-direction via the combined degrees of freedom of the movable platform 440 and of the pivotable support arm 420, comprises a group of dispensers 424a to 424d supplemented by the lowerable aspirating needle 423.

The dispensing unit 452 comprises a separate dispensing pump 455 in each case for supplying washing liquid WF, pretrigger liquid PTF and trigger liquid TF, wherein the flow of liquid from the dispensing pump 455 for the washing liquid can be switched to the straight washing needle 424a or to the angled washing needle 424b via a 3-way valve 457. The four selectively chargeable supply lines are made of a flexible plastic at the movable points and are guided in energy chains (not shown).

The dispensing pumps 455 of the dispensing unit 452 are each connected to the valve network 453 via separate supply lines, wherein, for rinsing and cleaning purposes, in particular for cleaning the dispensers 424a to 424d and the aspirating needle 423, in place of the primary conveying medium it is alternatively also possible to switch to compressed air DL or system water SW (deionized water) via a corresponding 3-way valve 427, and to supply this to the dispensing pumps 455.

The container of the washing station 442 for cleaning the dispensers 424a to 424d and the aspirating needle 423 has two aspirating lines 444a, 444b, of which one 444b is located in the bottom of the container and a second is located in the upper half of the container so as to be able to act as an overflow for setting a stable fill level. The aspirating unit 454 is connected both to the two aspirating lines 444a, 444b and to the aspirating needle 423 via flexible hose lines, which are guided in energy chains (not shown). In order to prevent unwanted backflow of aspirated liquids, shut-off valves 458 are provided in each case. The three discharge lines open into a common feed line to a suction pump 456 (for example a self-priming positive displacement pump), which supplies the aspirated waste liquids W to a collection or treatment area in the device (not shown)

Figure 6:
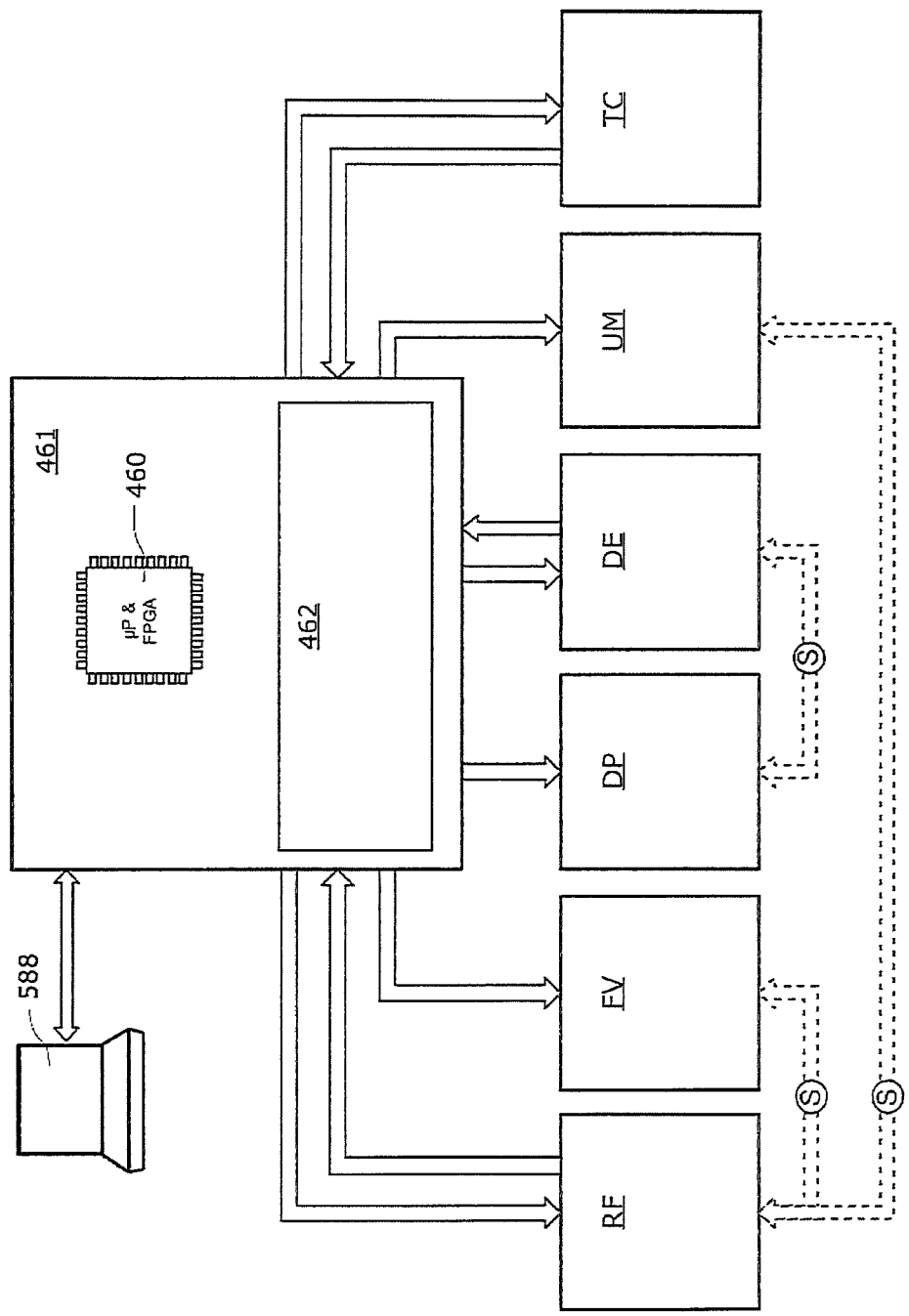
FIG. 6 shows a block diagram illustrating the electronic control of the device according to FIG. 2.

FIG. 6 shows a block diagram illustrating the electronic control of the device according to the invention shown in FIG. 2. The HetIA controller 460 of the controller board 461 operates the electrical and mechanical components of the HetIA module and is controlled and programmed by a main computer 588 (for example Personal Computer). The PC controls the flow and order of the sub-processes, and the HetIA controller 460 is responsible for executing the individual actions.

The functions of the HetIA controller 460 can be summarized as follows (see FIG. 6):
communication with PC 588 via Ethernet interface
robotics functions RF by means of stepper motors
    moving the platform 440 in the x-direction to the respective cuvette 201 of the stationary cuvette array 200 (and to the stationary reference light source 436b in the cuvette block 820 if no moving reference light source 436a is provided)
    rotating the rotor arm 447 in order to swap the position of the detection device 435 (photomultiplier) and magnet assembly 430
    y-movement for docking the photomultiplier 435 or the magnet assembly 430 onto the measurement window of the cuvette 201, and onto a reference light source 436a moving with the platform 440
    opening the shutter in front of the detector
controller FV of the fluidic valves 457, 458 of the fluidic system 451
controller DP for the metering pumps 455
controller UM for the ultrasonic transducer 840
    has a separate US oscillator which is independent of the controller board 461
    decoder function for the piezoelectric transducers 840 on the individual cuvettes 201
controller DE for the detection device 435 and also the reference light source 436a
temperature control TR for the temperature control device (37° C.)
    Peltier controller for the detection device 435 (photomultiplier)
    Peltier controller for the cuvette block 820

Certain functions which have to be triggered in a precisely synchronized manner in real time (see brackets "S" in FIG. 6) are realized in the FPGA of the HetIA controller 460. These are, for example:
    temporal triggering of the controller DP of the metering pump in time with the controller DE for the detection device 435 (photomultiplier measurement).
    triggering of the reference light source synchronously with the measurement of the photomultiplier
    ultrasonic mixing process of the respective cuvette.

The process of a heterogeneous immunoassay based on the example of a 1-step sandwich assay, already shown in FIG. 4, will now be described from the perspective of the machine processes necessary for this in the HetIA module. The temporal distribution of the machine activities during the assay is shown in lines I to XI over the common time axis t in FIG. 7.

I pipetting samples, reagents and a bead suspension into the cuvette 201
II controlling the temperature of the cuvette block
III activating the ultrasonic mixing unit
IV docking the magnet assembly 430 in order to separate the beads
V activities of the aspirating needle 423
VI washing the fixed beads by means of the angled washing needle 424b (laminar)
VII resuspending the beads by means of the straight washing needle 424a (turbulent)
VIII dispensing pretrigger liquid via the dispenser 424c (turbulent)
IX dispensing trigger liquid via the dispenser 424d (turbulent)
X swapping the position of the magnet assembly 430 and the photomultiplier 435 and measuring the luminescence at the cuvette 201
XI washing the aspirating needle 423 and the dispensers 424a to 424d

Figure 7:
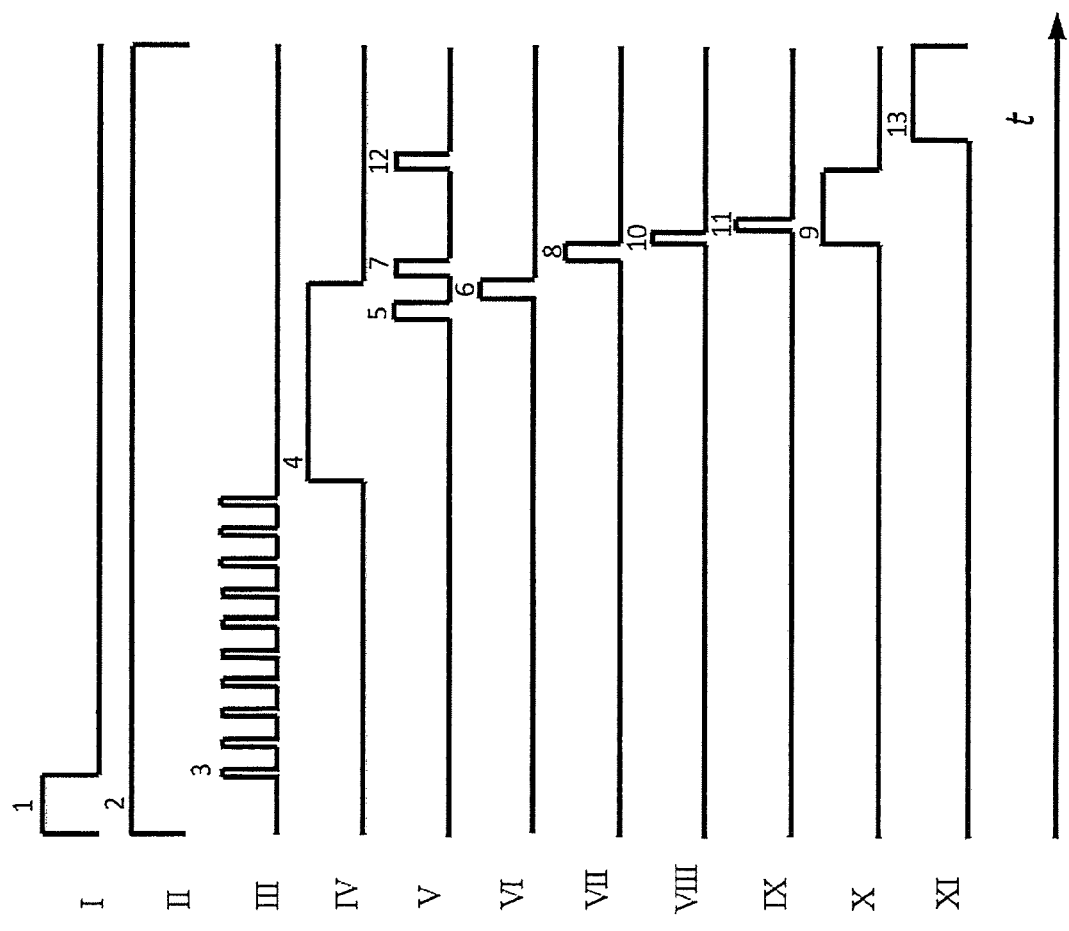
FIG. 7 shows a diagram of the time sequence of the individual activities in the device according to the invention during a heterogeneous immunoassay.

The individual measures are denoted 1 to 13 in chronological order in FIG. 7.

1) Firstly the sample, a suspension of magnetic particles (magnetic beads) with a coating of a capture antibody, and a solution of the tracer antibody are pipetted into the cuvette (see S1, FIG. 4). Machine pipetting may be carried out for example by a laboratory robot with x/y/z mobility, which is known from the prior art, whereas manual pipetting may be carried out by a laboratory technician, for example using hand-held pipettes with disposable tips.

2) As a constant background activity during all the machine processes of the assay, the temperature of the cuvette block 820 with the cuvettes 201 located therein is controlled to 37° C. (see line II).

3) The sample/reagent mixture in the cuvette 201 slowly heats up to the target temperature of 37° C. and is incubated for a total of approximately 10 minutes, while the ultrasonic mixing device firstly homogenizes the sample/reagent mixture by means of the ultrasonic transducer 840 on the cuvette 201 and continues to stir it repeatedly at short intervals in order to prevent the beads from sinking and agglomerating (see line III).

4) After the incubation has taken place, the magnetic separation of the incubated beads is initiated by rotating the magnet assembly 430 on the measurement and manipulation module 450 to the relevant access opening in the cuvette block 820 (see line IV).

5) Once the beads have been separated onto the wall of the cuvette 201, the aspirating needle 423 is lowered until it is near the cuvette bottom, and all the liquid in the cuvette is aspirated (see S4, FIG. 2), while the magnet assembly 430 remains in the access opening 825 so as to continue to hold the beads in place.

6) Washing solution is then introduced via the angled washing needle 424*b*, which washing solution flows in a laminar fashion along the wall of the cuvette 201 in order to wash any excess and unbound components from the wall and from the beads magnetically fixed on the wall (see line VI).

7) The cuvette 201 is then aspirated until dry, the beads still being magnetically fixed on the wall of the cuvette 201 (see line V).

8) Thereafter, washing liquid is again introduced via a second, vertically oriented washing needle 424*a*, which generates turbulence so that the beads are resuspended in the liquid when the magnet assembly is undocked (see line VII). This step is followed by another magnetic separation and aspiration according to steps 4) and 5) (not shown).

Steps 5-8 may optionally be repeated in order to achieve an even better separation of unbound tracer antibodies.

9) The position of the detection device 435 and the magnet assembly 430 is then swapped by rotating through 180°, and the detection device is introduced into the relevant access opening in the cuvette block 820 (see line X).

10) Then firstly pretrigger liquid is added via a first, vertically oriented dispenser 424*c*, which injects in a turbulent fashion (see S8, FIG. 4).

11) The luminescence is then triggered by adding the trigger liquid via a further, vertically oriented dispenser 424*d*, which injects in a turbulent fashion (see line IX).

12) The cuvette 201 is then emptied and washed by means of the cuvette washing device, or alternatively the aspirating needle 423 is re-introduced and the reaction mixture is aspirated and the cuvette 201 is replaced by a disposable cuvette.

13) Finally, the pivotable arm is pivoted horizontally to the side through 90° and is introduced into the washing station 442. The dispensers 424*a* to 424*d* and the aspirating needle 423 of the dispenser platform 421 are washed in that, for the (B/F) washing, washing solution flows out of one the two washing needles until the fill level is sufficient to wet all the needles (see line XI).

The invention claimed is:

1. A device for carrying out heterogeneous immunoassays by means of magnetic particles in lined-up cuvettes, wherein each of the cuvettes has a filling opening and at least one lateral measurement window being transparent to the measurement radiation, the device comprising:
   at least one stationary cuvette array, in which the cuvettes for holding liquid media are arranged,
   at least one support arm configured and arranged to be movable along the at least one stationary cuvette array and which is lowerable toward the filling opening of a selected cuvette, said at least one support arm having at least one aspirating needle which is lowerable toward the bottom of the selected cuvette, and
   at least one dispenser configured and arranged to be positioned above or in the filling opening, for dispensing the liquid media into the selected cuvette, and to dispense a washing solution for the magnetic particles,
   at least one magnet assembly configured and arranged for separating the magnetic particles on an inner surface of the selected cuvette, being movable along the at least one stationary cuvette array and acting on the contents of the selected cuvette, and
   at least one optical detection device configured and arranged for receiving a measurement signal that correlates with an analyte concentration in the selected cuvette, said at least one optical detection device being movable along the at least one stationary cuvette array and being alignable with the at least one measurement window of the selected cuvette,
   wherein the at least one dispenser is configured and arranged in a dispenser platform which can be lowered onto or into the filling opening of the selected cuvette, the lowerable aspirating needle passing through said dispenser platform.

2. The device according to claim 1, wherein the dispenser platform has, on a side facing toward the selected cuvette, a sealing surface or a form-fitting partition made of a material that is impervious to light.

3. The device according to claim 1, wherein the at least one dispenser includes
   a first dispenser, configured and arranged for dispensing a washing solution for the magnetic particles, has an outflow direction which is oriented substantially parallel to the longitudinal axis of the selected cuvette, and
   a second dispenser configured and arranged for dispensing a washing solution for the magnetic particles has an outflow direction which is directed onto an inner lateral surface of the selected cuvette.

4. The device according to claim 3, wherein the at least one dispenser further includes further dispensers, the outflow directions of which are oriented substantially parallel to the longitudinal axis of the selected cuvette, wherein one of the further dispensers is a third dispenser configured and arranged to dispense a pretrigger solution and a fourth dispenser configured and arranged to dispense a trigger solution.

5. The device according to claim 1, wherein the at least one support arm further includes a lifting and rotating device which is arranged on a platform that is movable along the at least one stationary cuvette array.

6. The device according to claim 5, further including a washing station for the aspirating needle and the at least one dispenser is arranged on the movable platform, the at least one support arm further configured and arranged to be lowerable onto the opening of said washing station after a rotational movement.

7. The device according to claim 5, further including a common suspension mount for the at least one magnet assembly and the at least one optical detection device is arranged on the movable platform.

8. The device according to claim 7, wherein the common suspension mount for the at least one magnet assembly and the at least one optical detection device is suitable for carrying out a translational or rotational movement in order to swap the positions of the at least one magnet assembly and the at least one optical detection device in front of the selected cuvette.

9. The device according to claim 8, wherein the at least one magnet assembly and the at least one optical detection device are attached to a rotor arm, which is mounted in the suspension mount, at an equal distance from a common axis of rotation.

10. The device according to claim 9, wherein the rotor arm mounted in the suspension mount is movable in translation in the direction of the axis of rotation, in order to move the at least one magnet assembly or the at least one optical detection device toward the at least one measurement window of the selected cuvette.

11. The device according to claim 5, wherein the at least one support arm arranged on the movable platform forms, along with the dispenser platform together with the at least one magnet assembly and the at least one optical detection device, a measurement and manipulation module which is movable along the at least one stationary cuvette array and which combines all the robotic, fluidic and metrological components for the process steps of a heterogeneous immunoassay.

12. The device according to claim 5, wherein a reference light source for calibrating the at least one optical detection device is arranged on the movable platform.

13. The device according to claim 1, wherein the at least one optical detection device is a photomultiplier.

14. The device according to claim 1, wherein the at least one magnet assembly includes a first magnet assembly and a second magnet assembly which, independently of the first magnet assembly, is movable along the at least one stationary cuvette array and acts on the contents of a selected cuvette.

15. The device according to claim 14, wherein the second magnet assembly is arranged such as to be movable along the at least one stationary cuvette array on a separate rail.

16. A method for determining an analyte in a sample by means of a heterogeneous immunoassay, wherein, in a first step sequence A, comprising
   a) a sample for determining the analyte, and
   b) a suspension of magnetic particles containing a capture antibody
are pipetted into a selected cuvette of a stationary cuvette array, and wherein the following step sequence B of an immunochemical analysis comprising
   c) incubating and stirring the cuvette contents,
   d) separating the magnetic particles by positioning a magnet assembly of a measurement and manipulation module to an access opening in the cuvette array,
   e) introducing and aspirating a washing solution one or more times via a washing needle of at least one dispenser of the measurement and manipulation module,
   f) pipetting in a tracer antibody or a tracer antigen and repeating steps d) and e),
   g) adding a metered quantity of at least one trigger liquid via a vertically oriented dispenser of the at least one dispenser of the measurement and manipulation module, and
   h) carrying out a luminometric measurement of the sample using a detection device of the measurement and manipulation module,
wherein steps d), e), g) and h) take place by means of at least one measurement and manipulation module which is movable along the cuvette array and which is stopped at the selected cuvette in order to carry out steps d), e), g) and h).

17. The method according to claim 16, wherein, while incubation of the cuvette contents is being carried out in the selected cuvette, the measurement and manipulation module is moved to at least one further cuvette of the cuvette array in order to carry out steps e), g) and h) of step sequence B of an immunochemical analysis.

18. The method according to claim 16, wherein, after the luminometric measurement of the sample in point h), the contents of the used cuvette are emptied by means of the aspirating needle and the cuvette either is replaced by a disposable cuvette or is cleaned and reused.

19. The method according to claim 18, wherein the cuvette is cleaned by introducing a washing liquid by means of the dispensing needle and emptying and drying by means of an aspirating needle.

20. The method according to claim 18, wherein the cuvette is cleaned by means of a cuvette washer which is movable along the cuvette array.

21. A method for determining an analyte in a sample by means of a heterogeneous immunoassay, wherein firstly, in a first step sequence A, comprising
   a) a sample for determining the analyte,
   b) a suspension of magnetic particles containing a capture antibody, and
   c) a tracer antibody or a tracer antigen
are pipetted into a selected cuvette of a stationary cuvette array, and wherein the following step sequence B of an immunochemical analysis comprising
   d) incubating and stirring the cuvette contents,
   e) separating the magnetic particles by positioning a magnet assembly of a measurement and manipulation module to an access opening in the cuvette array,
   f) introducing and aspirating a washing solution one or more times via a washing needle of at least one dispenser of the measurement and manipulation module,
   g) adding a metered quantity of at least one trigger liquid via a vertically oriented dispenser of the at least one dispenser of the measurement and manipulation module, and
   h) carrying out a luminometric measurement of the sample using a detection device of the measurement and manipulation module,
wherein steps e) to h) take place by means of at least one measurement and manipulation module which is movable along the cuvette array and which is stopped at the selected cuvette in order to carry out steps e) to h).

* * * * *